United States Patent
Loukes et al.

[15] 3,656,926
[45] Apr. 18, 1972

[54] COATING OF GLASS IN FLOAT GLASS METHOD AND APPARATUS

[72] Inventors: David Gordon Loukes, Eccleston Park, Prescot; Alan Edwards, Widnes, both of England

[73] Assignee: Pilkington Brothers Limited, Liverpool, Lancashire, England

[22] Filed: June 26, 1969

[21] Appl. No.: 836,712

[30] Foreign Application Priority Data

June 24, 1968 Great Britain.....................29,998/68

[52] U.S. Cl.................................65/60, 65/99 A, 65/182 R, 117/35 V
[51] Int. Cl....................................C03b 18/00, C03c 17/00
[58] Field of Search...........................65/99, 182, 60; 117/35

[56] References Cited

UNITED STATES PATENTS

| | | |
|---|---|---|
| 2,628,921 | 2/1953 | Weinrich.............................117/35 X |
| 3,463,663 | 8/1969 | Chopra.............................65/60 UX |
| 3,505,048 | 4/1970 | Plumat.............................65/182 X |
| 3,518,939 | 7/1970 | Donner et al......................65/60 UX |

*Primary Examiner*—S. Leon Bashore
*Assistant Examiner*—Robert L. Lindsay, Jr.
*Attorney*—Morrison, Kennedy & Campbell

[57] ABSTRACT

Glass is coated with, for example a metal or oxide coating, by releasing towards the glass surface a vaporized material for coating the glass, and by regulating the temperature of the glass relative to the temperature of the vapor the glass surface is made receptive to a coating of the vaporized material which condenses on the glass surface. The coating material, for example a body of molten silver, is located adjacent the upper surface of the glass by a locating member extending transversely across the glass width. The locating member is connected to the terminals of an electric circuit to heat the silver and cause vaporization thereof, the vaporized particles being received by the glass surface.

17 Claims, 6 Drawing Figures

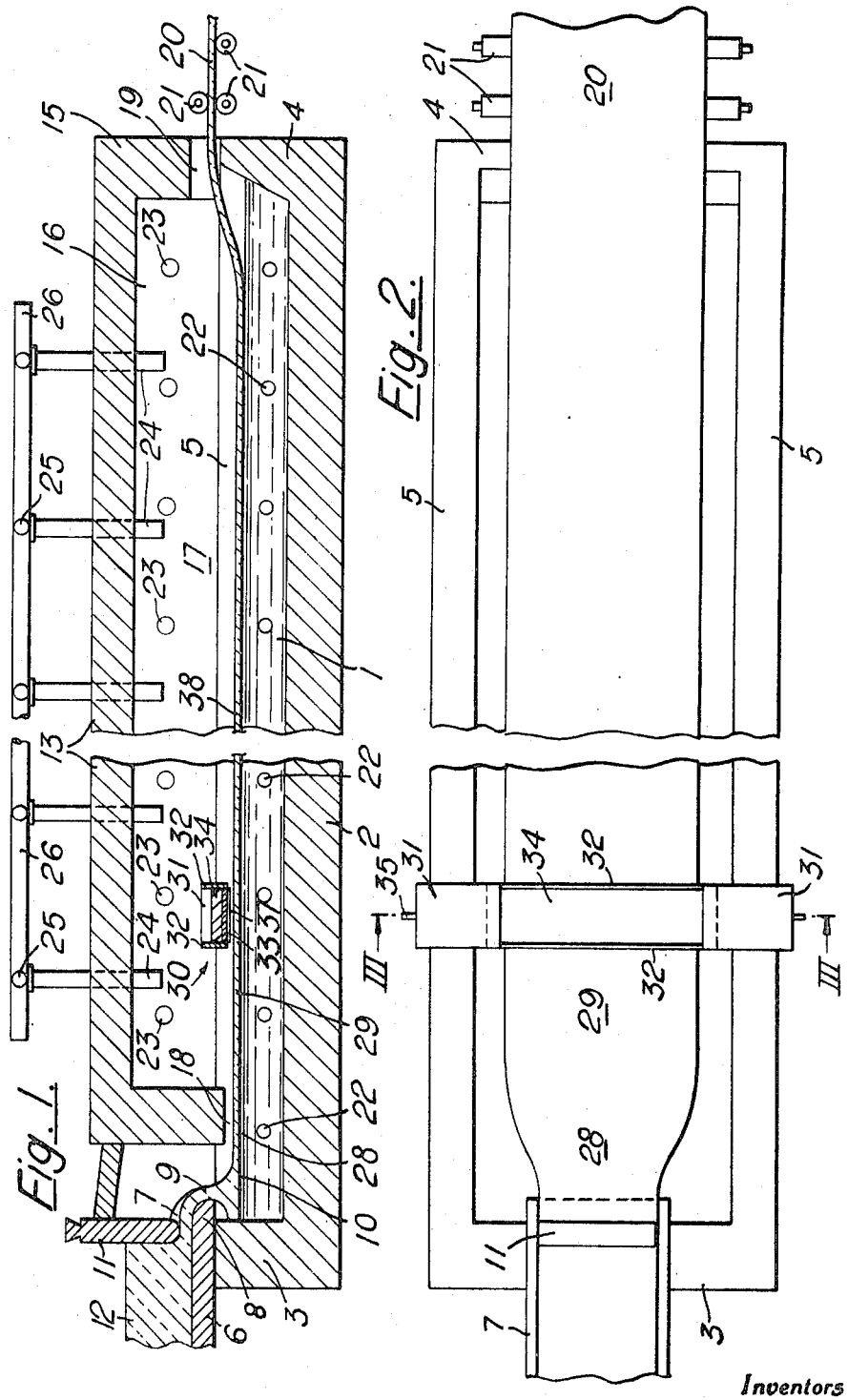

ing tweel 11 which holds back a head of molten glass 12 on the
3,656,926

COATING OF GLASS IN FLOAT GLASS METHOD AND APPARATUS

BACKGROUND OF THE INVENTION

This invention relates to the surface treatment of glass and more especially to methods and apparatus for coating glass, and it is a main object of the invention to provide an improved adherent coating of a condensed material on the surface of the glass.

SUMMARY

According to the invention there is provided a method of treating a glass surface in which the glass to be treated is supported in an atmosphere, comprising releasing towards the glass surface vapor of a material for coating the glass, regulating the temperature at which the vapor is released, and thermally conditioning the glass so that its surface is at a temperature below that of the released vapor, and is receptive to a coating of said material which condenses on the glass surface.

The glass may be supported by any suitable means which enables the thermal conditioning of the glass to be achieved without deformation of the glass. For example flat glass in ribbon form or in sheet form, which sheet may be plane or curved, may be supported at the desired high temperature on a gaseous cushion as the glass is treated. The glass may alternatively be supported by floating on molten metal for example on a bath of molten tin or a molten tim alloy having a specific gravity greater than that of the glass.

The invention is especially applicable to the surface treatment of float glass, which glass is produced on a bath of molten metal by delivering molten glass to the bath at a controlled rate and permitting unhindered lateral flow of the advancing glass under the influence of surface tension and gravity to produce a buoyant body of molten glass on the bath which is thereafter advanced in ribbon form along the bath and is cooled sufficiently to enable it to be taken unharmed from the bath on ribbon form. The temperature of the glass on the bath is regulated from the hot end where the molten glass is delivered to the bath end the temperature is in the region of 1,000° C, to the cold end of the bath where the ribbon of float glass is taken from the bath and where the temperature of the glass is usually in the region of 600° C.

The glass so produced has the highly desirable and well known float characteristics of flat parallel surfaces which have a fire-finish luster, the glass being free from distortion and surface imperfections.

During the advance of the glass along the bath the thermal condition of the glass is especially conducive to the surface treatment according to the invention.

The invention also includes apparatus for use in producing surface treated glass by a method as hereinbefore described comprising means for supporting glass to be treated, thermal regulators associated with the supporting means for maintaining the supported glass at a temperature at which its surface is receptive to a vaporized coating material, a locating member adapted for positioning adjacent the glass surface to be treated for locating adjacent the glass a molten body of material for vaporization and deposition on the glass, and electrical connectors for connecting the locating member to a heating current supply circuit.

The invention also comprehends glass having a surface coating condensed thereon by a method as hereinbefore described.

BRIEF DESCRIPTION OF THE DRAWINGS

FIG. 1 is a side elevation of a tank structure holding a bath of molten metal on which flat glass in ribbon form is produced by the float process and illustrating the locating member with a porous base beneath which a film of molten material is formed close to the surface of the ribbon of glass near the hot end of the bath, FIG. 2 is a plan view of the apparatus of FIG. 1 with the roof structure removed.

DESCRIPTION OF THE PREFERRED EMBODIMENTS

Figure 3:
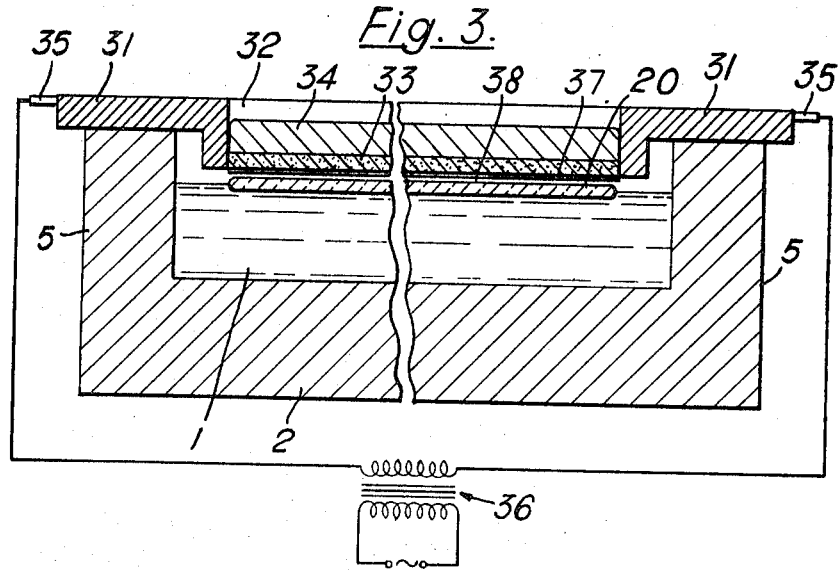
FIG. 3 is a section of line III—III of FIG. 2.

Referring to FIGS. 1, 2 and 3 of the drawings, which show the application of the invention to the float process, a bath of molten metal 1 for example molten tin or a tin alloy in which tin predominates and which has a specific gravity greater than that of glass, is contained in a tank structure comprising a floor 2, end walls 3 and 4 and side walls 5. The end walls 3 and 4 and side walls 5 are integral with the floor 2.

Mounted on top of the end wall 3 at the inlet end of the tank structure is a spout having a floor 6 and side jambs 7 which with the floor constitute a rectangular shaped lip 8 over which molten glass 9 is poured at a controlled rate onto the surface 10 of the bath 1 of molten metal. The rate of flow of the molten glass 9 over the lip 8 of the spout is controlled by a regulating tweel 11 which holds back a head of molten glass 12 on the floor 6 of the spout which forms an extension of a forehearth of a glass melting tank.

Mounted above the tank structure there is a roof structure constituted by a roof 13, end walls 14 and 15 and side walls 16. The roof structure defines a headspace 17 over the bath and the inlet end wall extends downwardly towards the surface of the molten glass poured onto the bath to define an inlet 18, which is restricted in height, through which inlet molten glass is advanced along the bath. At the outlet end of the tank structure the outlet end wall 15 of the roof structure defines an outlet 19 through which the ultimate ribbon of glass 20 is discharged on conveyor rollers 21 which apply traction to the glass to assist the advance of the ribbon of glass along the bath.

Temperature regulators 22 are immersed in the bath and there are radiant heaters 23 in the roof structure. These together control the thermal condition of the glass throughout its travel along the bath of molten metal. A protective atmosphere, for example an inert nitrogen, helium or argon atmosphere is supplied into the head space 17 through ducts 24 connected by headers 25 to a main supply duct 26 mounted above the roof 13. The atmosphere is maintained at a plenum in the headspace over the bath and prevents ingress of external atmosphere into the headspace 17. The atmosphere thus acts as a protective atmosphere to prevent oxidation of the molten metal bath and of metal parts of apparatus to be mounted in the headspace above the bath of molten metal.

For some embodiments the atmosphere supplied may include a reducing constituent, for example the atmosphere may be 95 percent nitrogen and 5 percent hydrogen.

The molten glass 9 which flows over the spout lip 8 onto the bath forms a layer 28 of molten glass on the bath surface which layer is at a temperature of about 1,000° C. At this temperature, which is regulated by the heaters 23 in the headspace and the regulators 22 in the bath of molten metal, the molten glass in the layer 28 flows laterally unhindered as indicated in FIG. 2 to the limit of its free flow to form a buoyant body 29 of molten glass which is then advanced in ribbon form along the bath. The tank structure at the surface level 10 of the bath is wider than the ribbon of glass so produced by the unhindered lateral flow.

The glass is cooling during this flow and during its continued advance it is subjected to a surface treatment by the method of the invention.

A locating member 30 in the form of a beam of refractory metal, for example tungsten or molybdenum bridges the bath of molten metal in this region where the glass is still so hot that its surface is in a plastic state receptive to modification. The locating member is in the form of a beam which is shaped as a container for molten material to be used in the surface modification of the glass. The ends of the beam are of massive form, as shown at 31 in FIG. 3, and rest on, and are insulated from, the tops of the side walls 5 of the tank structure. The central part of the beam which extends across and above the whole width of the ribbon of glass 20, is formed with side walls 32 extending across the bath between the massive ends 31 and a floor 33 which is of porous refractory material preferably porous tungsten. The floor is for example formed of sintered tungsten. The side walls 32 and floor 33 thus define within the bar a container for a reservoir 34 of the molten material. This molten body 34 is for example a body of molten silver and the presence of the nonoxidizing atmosphere in the headspace over the bath protect both the tungsten beam 30 and the body of molten silver 34 from oxidation.

Electrical connection is made to the massive end pieces of the beam 30 by heavy duty bus bars indicated at 35. These bus bars are connected, as indicated diagrammatically in FIG. 3, to the secondary winding of a heavy duty current transformer 36 which forms the output transformer of an alternating current supply. A very large alternating current for example 2,000 amperes is supplied at a low voltage and the passage of this alternating current through the locating member raises the temperature of the beam 30 to a temperature above 2,000° C. The frequency of the alternating current is usually mains frequency, but both the frequency and output current of the alternating current supply may be varied to regulate the temperature achieved in the reservoir 34 of molten metal and in the porous floor of the locating member through which floor the molten metal, in this example silver, permeates to constitute beneath the porous floor a film 37 of molten silver which film extends across and above the whole width of the ribbon of glass by clinging to the underneath of the porous floor 33. The film 37 is continuously replenished by molten silver permeating through the porous floor 33 from the reservoir 34.

In one embodiment the porous tungsten floor is 3 mm. thick and the undersurface of the floor is 15 cm. long in the direction of advance of the ribbon of glass along the bath. The reservoir 34 is about 6 mm. deep, and it is understood that all the dimensions are exaggerated in the drawings for the sake of clarity.

The beam 30 is so supported that the undersurface of the porous floor 33 is very close to the upper surface 38 of the ribbon of glass advancing along the bath. For example the undersurface of the floor 33, and therefore the film 37 of molten metal, is about 2 mm above the ribbon surface 38. Because the glass is held at a high temperature, for example in the range 600° to 950° C, There is no risk of the much hotter molten metal film 37 causing any damage to the glass, and the temperature of the glass is sufficiently low to permit condensation of vaporized silver from the film 37 onto the upper surface of the glass.

Because of the formation of the uniform film 37 extending right across the full width of the ribbon of glass there is uniform release of vaporized silver towards the glass surface and uniform condensation of silver onto the glass surface. Metal particles condensed onto the glass surface may sink into the hot glass surface to an extent sufficient to ensure that the condensed metal coating keys to the glass, which results in an extremely durable metal film coating the glass.

After it passes from beneath the beam 30 the glass carrying its metalized surface coating is cooled in the usual manner during further advance along the bath until it reaches a temperature of about 600° C near to the cold end of the bath at which temperature the ribbon of glass can be taken unharmed from the bath surface by the rollers 21 for passage to an annealing lehr. A nonoxidizing atmosphere is maintained in the lehr to prevent oxidation of the metalized surface film.

Because a virgin hot glass which has just been formed by the unhindered lateral flow of the molten glass on the surface of the bath of molten metal, is being treated by the close vaporization of a molten metal adjacent that surface, extremely good metal to glass adhesion is achieved and this adhesion does not interfere with the float properties of the glass. aluminum. aluminum, The uniform heating of the molten metal to cause its vaporization adjacent the glass surface results in the production of uniform coatings of metal on the glass. Other metals which have been employed in carrying out the method of the invention are gold, copper, tin, bismuth, zinc and aluminium. With the more reactive metals such as aluminium, an inert atmosphere, for example argon, is employed either to fill the whole of the headspace 17 or is maintained only in the vaporizing zone within a hood enclosing the beam 30.

Figure 4:
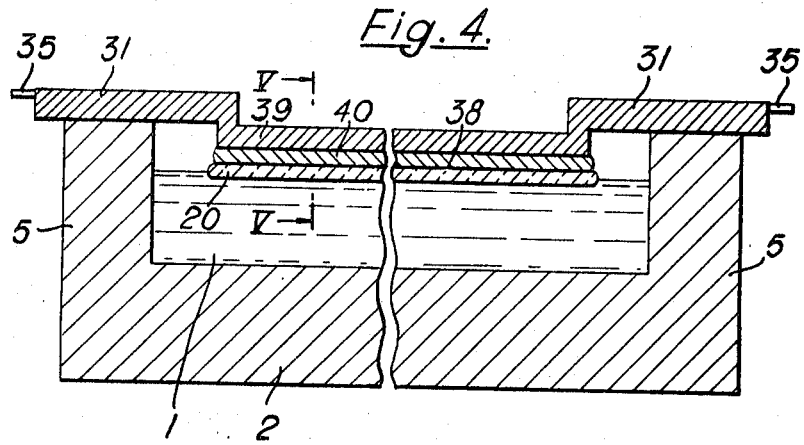
FIG. 4 is a view similar to FIG. 3 illustrating a second embodiment of the invention.
Figure 5:
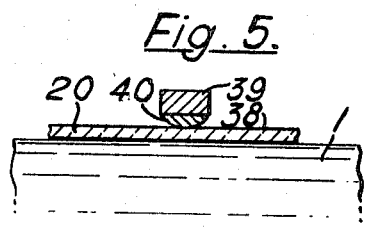
FIG. 5 is a section of line V—V of FIG. 4.

Another embodiment of the invention is illustrated in FIGS. 4 and 5 which show a locating member in the form of a narrow bar of refractory metal 39, for example tungsten or molybdenum. The bar 39 is held between the massive end pieces 31 through which heating current is supplied in the same way as illustrated in FIGS. 1 to 3. The body of molten material for example molten metal to be used in the treatment of the glass surface is an elongated body which clings as indicated at 40 to the undersurface of the narrow locating member. The width of the locating member 39 considered in the direction of advance A of the ribbon of glass 20 along the bath is for example 6 mm., and at this width a molten metal for example molten silver constituting the body 40 hangs in a substantially semi-cylindrical form as indicated in FIG. 5 beneath the bar 39. The arrangement of the locating bar 39 in the apparatus illustrated is such that the body 40 clinging to the bar just touches the glass surface 38 which is being treated.

The large alternating current for example 2,000 amperes is passed through the bar 39 and also flows through the molten body 40 to maintain that body at a temperature of about 2,000° C. The rate of advance of the ribbon ensures that there is no damage to the glass surface due to overheating, particularly as the fact that the molten body 40 is just touching the glass surface means that there is little heat loss by the body 40 by conduction to the glass. Molten metal is vaporized from the downwardly curved surfaces of the body 40 towards the glass surface and the distance through which vapor has to travel before it contacts the upper surface 38 of the ribbon of glass is extremely small. The non-wetting nature of the contact between the molten body 40 and the glass surface 38 results in downward facing molten metal surfaces at both the upstream and downstream edges of the pool and this means that there are steep vapor concentration gradients existing through the interspace between the surface of the molten body 40 and the glass, ensuring fast deposition rates and resulting in a highly concentrated surface coating on the glass.

In addition to the alternating current traveling through the locating member in the illustrated embodiments a direct current component can be superimposed to travel from the locating member through the thickness of the glass being treated to the bath of molten metal 1. An electrode immersed in the molten metal bath enables this D.C. component to be effective. The presence of the D.C. component helps the wetting of the molten metal to the bar and also may modify the glass surface immediately prior to the vapor deposition from the downstream edge of the body 40. This could help in providing nucleation points on the surface 38 of the glass for the further condensation of metal vapors thus giving improved metal film to glass adhesion.

Figure 6:
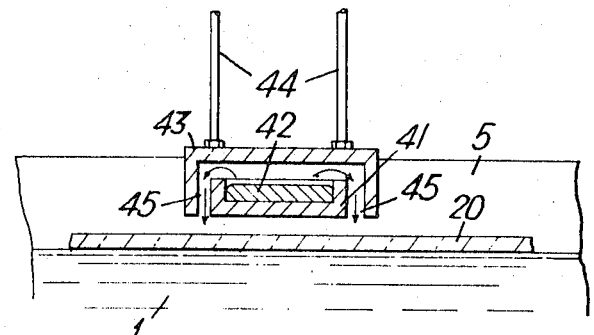
FIG. 6 is a vertical section through another embodiment of the invention, in which vapors are directed downwardly onto the glass surface.

In the embodiment of FIG. 6, the locating member is formed as a shallow carbon boat 41 which extends across the tank structure and is so supported between the tank side walls 5 that the bottom of the boat 41 is located just above the upper surface of the ribbon of glass 20. For example there may be a 2 mm. gap between the bottom of the boat and the glass surface.

A shallow body 42 of the molten material is located in the boat and has a large surface from which vaporization can take place adjacent the glass surface to be treated.

A hood 43, e.g., of refractory metal or carbon, is fixed over the boat, being supported between the tank side walls and steadied by struts 44 fixed to the roof structure or to a structural beam carried by the roof structure. The hood 43 is wider than the boat 41 so that elongated, slot-shaped channels 45 exist between the inner surface of the hood and the outer surface of the boat, which channels deflect downwardly vapors emanating from the surface of the molten body 42. The hood and the boat are both electrically heated to about the same temperature so that the temperature of the vapors is maintained as they are downwardly deflected by the hood on to the glass surface where the vapors condense.

The surface treatment may be effected near the hot end of the bath of molten metal, but it is preferred to apply the method of the invention nearer to the outlet end of the bath where the temperature of the glass is, say for example 700° C. Because of the continuous advance of the ribbon of glass beneath the high temperature beam there is no undue heating of the ribbon of glass due to the presence of the high temperature beam extending across the ribbon and thus there is no limitation to the use of the method of the invention anywhere in the float process so long as the glass surface is sufficiently hot to be receptive to the coating but is below the temperature of the material being employed to coat the glass. In addition to molten metals, oxide coatings may be produced on the glass surface by the method of the invention, for example a coating of an oxide or bismuth, silicon, titanium, iron, or antimony.

The invention may also be employed for the treatment of glass in sheet form for example flat sheets of glass or curved sheets of glass such as are used for television tube face plates or windows for vehicles. The invention may also be applied to the treatment of rolled glass for example rolled patterned glass or rolled glass sections for use as building elements. The provision of a highly reflective surface on such rolled glass is often advantageous.

The treatment of glass articles for example hollow glass articles, such as hollow glass blocks or insulators can also be effected by the method of the invention. Hollow glass articles are still sufficiently hot from the molding process to be receptive to the vaporization according to the invention. The locating member employed in such methods would be shaped to match the shape of the hollow article being treated.

Some applications of the invention are to the production of mirror finishes on glass when for example employing silver or aluminium as the molten body.

Heat rejecting glasses can be made by using gold or copper; also ferrous oxide which is vaporized onto the glass surface at the hot end in the float process and allowed to dissolve into the glass surface.

Optical interference films can be obtained by oxidizing metal films or by vaporing an oxide onto the glass surface. Multi-layer coatings can be built up for example to reflect infra-red heat selectively.

Colored glasses can be made by oxidizing the metal film produced on the glass surface. For example a film of cobalt metal may be oxidized to cobalt oxide and blue glass obtained by allowing the cobalt oxide to dissolve in the glass surface by suitable temperature regulation. In the same way a film of nickel, chromium or manganese may be produced on the glass by the method of the invention, and upon oxidation and subsequent solution in the glass, nickel oxide gives a grey color, chromium oxide a green color and manganese oxide a purple color.

Further, electrically conducting glasses can be produced by the production on the glass surface of thin films of gold or of mixtures of tin oxide and antimony oxide. More than one metal or oxide can be used in the coating by for example the use of bodies of metal alloys for example a tin antimony alloy or by a dual treatment in which the glass is first subjected to a vapor of the one metal and then to a vapor of the second metal.

The invention thus provides an improved method for the production of surface coated glass which avoids the disadvantages of vacuum techniques such as have been employed hitherto and results in a metallised, or oxide coated, glass having an adherent coating with a much greater adherence and durability than has been achieved hitherto by the known techniques.

We claim:

1. Float glass manufacturing apparatus for producing surface treated float glass, comprising a tank structure containing a bath of molten metal, means for delivering glass to the bath at a controlled rate and advancing the glass in ribbon form along the bath, a roof structure over the tank structure, means for supplying a protective atmosphere into the headspace defined by the roof structure over the bath, a beam of refractory metal fixed across the tank structure so as to bridge the path of travel of the ribbon of glass along the bath and to lie adjacent the upper surface of the ribbon for locating in close proximity to that surface a molten body of a material for vaporization and deposition on that glass surface, electrical connectors for connecting the beam to a heating current supply circuit, and thermal regulators associated with the bath for maintaining the advancing glass ribbon at a temperature at which its upper surface is receptive to coating material vapor released from the molten material adjacent the upper surface of the glass ribbon, said beam being shaped as a container for the molten material and having a porous metal base through which the molten material permeates into the vicinity of the glass surface to be treated.

2. Float glass manufacturing apparatus for producing surface treated float glass, comprising a tank structure containing a bath of molten metal, means for delivering glass to the bath at a controlled rate and advancing the glass in ribbon form along the bath, a roof structure over the tank structure, means for supplying a protective atmosphere into the headspace defined by the roof structure over the bath, a beam of refractory electrically conductive material fixed across the tank structure so as to bridge the path of travel of the ribbon of glass along the bath and to lie adjacent the upper surface of the ribbon, for locating in close proximity to that surface a molten body of a material for vaporization and deposition on that glass surface, electrical connectors for connecting the beam to a heating current supply circuit for heating the molten body and thermal regulators associated with the bath for maintaining the advancing glass ribbon at a temperature at which its upper surface is receptive to coating material vapor released from the molten material adjacent the upper surface of the glass ribbon, said beam being formed as a shallow container for locating the molten body to be vaporized, a hood being fixed over the container, which hood is wider than the container to define channel means directed toward the glass surface, said hood being positioned to deflect vapors downwardly through said channel means onto the glass surface, and said heating current supply circuit being connected to the hood so as to maintain the temperature of the downwardly deflected vapors.

3. A method of treating float glass comprising advancing glass in ribbon form along a bath of molten metal, maintaining a protective atmosphere at a plenum over the bath, maintaining in close proximity to the upper surface of the ribbon of float glass a molten body of a material for treating the glass surface, causing the molten body to cling to the underface of a locating member bridging the path of travel of the glass to define as a vapor source a surface of the clinging molten body co-extensive with an area to be treated of the upper surface of the glass advancing beneath that body, heating the molten body to release vapor from said molten body surface, regulating the heating of the molten body to regulate the temperature of the released vapor, and thermally conditioning the ribbon of glass prior to its advance beneath the molten body so that its upper surface is at a temperature below that of the released vapor, and condensing on the upper surface of the glass vapor released from said molten body.

4. Float glass manufacturing apparatus for producing surface treated float glass, comprising a tank structure containing a bath of molten metal, means for delivering glass to the bath at a controlled rate and advancing the glass in ribbon form along the bath, a roof structure over the tank structure, means for supplying a protective atmosphere into the headspace defined by the roof structure over the bath, a beam of refractory metal fixed across the tank structure so as to bridge the path of travel of the ribbon of glass along the bath and to lie adjacent the upper surface of the ribbon for locating in close proximity to that surface a molten body of a material for vaporization and deposition on that glass surface, which refractory metal is wetted by the molten material, a heating current supply circuit having a pair of terminals, said beam being connected to said said terminals to heat said molten body and cause vaporization thereof, and thermal regulators associated with the bath of maintaining the advancing glass ribbon at a temperature at which its upper surface is receptive to coating material vapor released from the molten body adjacent the glass surface.

5. A method according to claim 3, wherein heating electric current is passed through the molten body to cause said vaporization.

6. Apparatus according to claim 4, wherein the beam is a narrow bar of refractory metal which bridges the bath of molten metal at a height above the bath surface sufficient to permit a body of molten material clinging to the bar just to touch the glass surface.

7. Apparatus according to claim 1, wherein the refractory metal is selected from the group consisting of tungsten and molybdenum.

8. A method according to claim 3, wherein said step of causing includes the step of causing the molten body to cling to the underface of an electrically conductive locating member, and said step of heating comprising heating the molten body by supplying heating electric current to that locating member.

9. A method according to claim 3, wherein a shallow body of molten material is supported just above the glass surface, heating electric current is passed through the body to vaporize the material, and vapors from the surface of the shallow body are directed downwardly onto the glass.

10. A method according to claim 8 wherein the step of heating includes the step of supplying heating current to the locating member by passing an alternating current through the locating member.

11. A method according to claim 8, wherein the material of the molten body is selected from the group consisting of gold, silver, copper, tin, bismuth, zinc and aluminum.

12. A method according to claim 11, wherein the molten body is tin, and further comprising the step of exposing the tin-coated surface while still hot to an oxidizing atmosphere to produce a stannic oxide coating on the glass.

13. A method according to claim 8, wherein the material of the molten body is an oxide selected from oxides of bismuth, silicon, titanium, iron and antimony.

14. A method according to claim 8, wherein the material of the molten body is selected from the group consisting of cobalt, nickel, chromium, and manganese, and further comprising the step of exposing the metal-coated glass surface to an oxidizing atmosphere at a temperature to produce an oxide film which dissolves in the glass surface to produce a colored glass.

15. A method according to claim 8, including providing said electrically conductive locating member with a porous base whose underface extends across and above the whole width of the ribbon of glass, causing the molten body to cling to the whole of said underface of said porous base as a film of the molten material which film extends across and above the whole width of the ribbon of glass, and causing said film to be continuously replenished by permeation of the molten material through said porous base from a reservoir of the molten material held in the locating member.

16. A method according to claim 8, and further providing said locating member with a narrow undersurface extending across and above the whole width of the ribbon of glass to cause said molten body to be shaped as a narrow elongated body extending across and above the whole width of the ribbon.

17. A method according to claim 16, and further comprising the step of causing the lowermost surface of said molten body to touch the upper surface of the glass.

* * * * *